UNITED STATES PATENT OFFICE.

WILLIAM A. FAIRBURN, OF SHORT HILLS, NEW JERSEY, ASSIGNOR TO THE DIAMOND MATCH COMPANY, OF CHICAGO, ILLINOIS, A CORPORATION OF ILLINOIS.

PROCESS OF TREATING MATCH-SPLINT MATERIAL.

1,079,119. Specification of Letters Patent. Patented Nov. 18, 1913.

No Drawing. Application filed January 2, 1913. Serial No. 739,741.

*To all whom it may concern:*

Be it known that I, WILLIAM A. FAIRBURN, a citizen of the United States, and resident of Short Hills, in the county of Essex and State of New Jersey, have invented certain new and useful Improvements in Processes of Treating Match-Splint Material, of which the following is a specification.

This invention relates to a process whereby match splints are effectually and economically impregnated with a compound which renders them non-glowing after the splints, as finished matches, have been ignited and the flame extinguished.

After exhaustive experimentation to discover a volatile substance, the gases or fumes of which could be utilized to impregnate match splint material (including splints and blocks) exposed thereto and enter into the formation of a compound that would fixedly impart to such material the desired non-glowing characteristics without the necessity of subjecting the material to excessive moisture or to excessive drying heat, I have demonstrated that the gases or fumes of white or yellow phosphorus will satisfactorily fulfil the desired conditions and requirements.

In carrying out my invention in one aspect thereof I place the match stock (preferably wooden blocks of proper dimensions for severance into match splints) in a gas tight chamber with which communicates a pipe (having a suitable regulating valve) leading from a capacious chamber, also gas tight, in which white or yellow phosphorus is contained, and I subject the contents of said latter chamber to gentle heat with either incomplete access of air, thus generating principally phosphorous trioxid ($P_2O_3$), or a liberal supply of air, thus generating principally phosphorus pentoxid ($P_2O_5$). The fumes or gases resulting flow into an impregnating chamber, and are absorbed in a large volume by the match stock contained therein. The stock is confined within the impregnating chamber and therein exposed to the action of the phosphorus fumes until the requisite incorporation of the fumes with the wood has been effected; the period of exposure being a variable one, depending principally upon the volume and density of the fumes and the porosity of the match stock subjected thereto. With impregnating and generating chambers of a certain relative capacity, the period of treatment of the stock of whatever material, can be readily determined. In any case as the operation proceeds a specimen of the material can be readily removed and tested and the process continued until the stock responds to a prescribed test. By a variation of temperature, air supply and relative humidity of said air supply, the rapidity with which the phosphorus fumes are generated can be materially influenced.

The match stock when duly impregnated with the components of phosphorus fumes may be applied to a continuous match making machine and therein cut into splints, which as rapidly as they are produced are inserted row by row into the splint chain, and transported thereby through the match-making path which includes the usual device for applying the paraffin and ignition-head composition to the splints. The splints of the matches thus produced possess the requisite non-glowing characteristic, the same resulting from the presence of phosphorus acid or phosphoric acid in the splints. The acid to some extent at least, is a constituent of the phosphorus fumes or gases, the quality and quantity of the acid depending in a measure upon the percentage of moisture admitted to the phosphorus; or, in other words, the said fumes or gases consist of a fine mist containing oxids of phosphorus and phosphorus acid or phosphoric acid in an extremely fine or colloidal state of subdivision which facilitates absorption by the splint material. When the wood thus treated is exposed to the atmosphere any phosphorus oxid or anhydrids in the material will absorb moisture and become phosphorus acid or phosphoric acid. The quantity of either acid required to accomplish effective impregnation is so small, however, that no material dampness of the splint material can be noticed, and whatever trace of moisture is present on material used in a continuous match machine will be dissipated during the passage of said material through the atmosphere in the chain of the match machine.

In another aspect of my invention the splints are cut from stock and subjected in bulk to the action of the phosphorus fumes. The splints thus impregnated are then applied to a match machine of the magazine type, wherein the splints are fed from a hopper into the splint carrier.

In still another aspect of my invention the splints are subjected to the action of the phosphorus fumes, and thereby impregnated, while the splints are being transported by the splint carrier; the carrier in that case progressing through the impregnating chamber.

Irrespective of the mode which may be employed to effect the impregnation of the match splints with the components of the phosphorus fumes, I find that the splints thus treated possess in a high degree the characteristic of non-glowing after the match has been ignited and the flame extinguished.

I claim—

1. The process of treating match splint material to impart a non-glowing property thereto, which consists in impregnating the same with an oxid of phosphorus and then exposing the material to the air.

2. The process of treating match splint material to impart a non-glowing property thereto, which consists in subjecting the same to phosphorus fumes, and then exposing the material to the air.

3. The process of treating match splint material to impart a non-glowing property thereto, which consists in subjecting the same to the fumes generated by gently heating phosphorus with incomplete access of air, and then exposing the material to the air.

Signed at New York, in the county and State of New York this 31st day of December, 1912.

WILLIAM A. FAIRBURN.

Witnesses:
B. CHANDLER SNEAD,
FRANCES K. GRIFFIN.

Copies of this patent may be obtained for five cents each, by addressing the "Commissioner of Patents, Washington, D. C."